Oct. 9, 1934.  H. W. SPRAGUE  1,976,099
CUTTER HEAD
Filed July 30, 1932
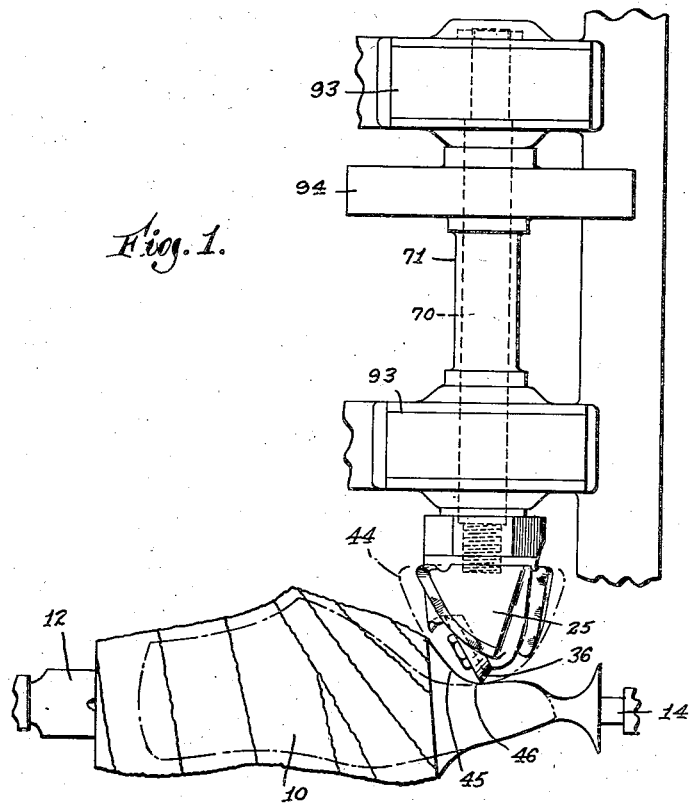
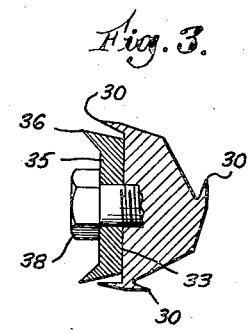
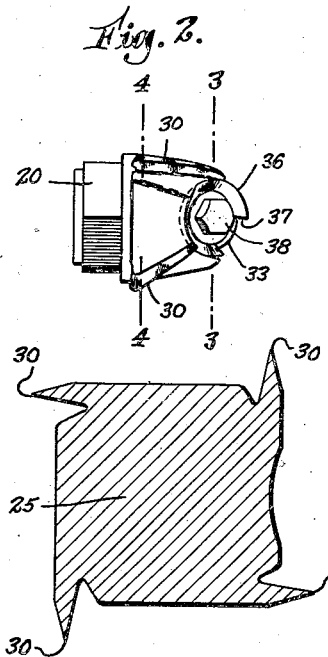
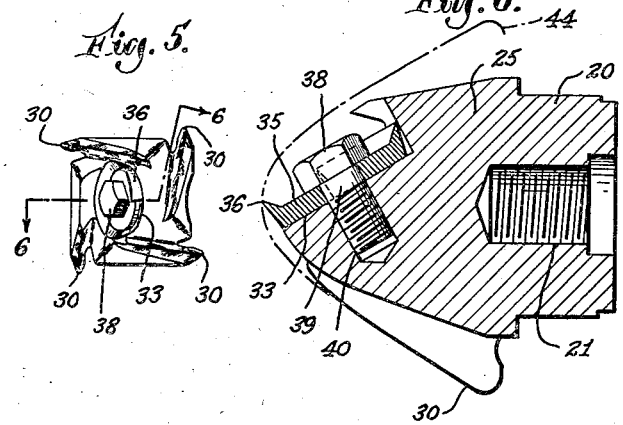
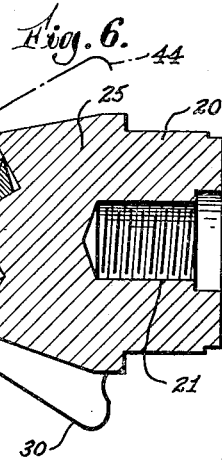
Inventor
Harold W. Sprague
by James R. Hodder
Attorney Patented Oct. 9, 1934

1,976,099

UNITED STATES PATENT OFFICE 1,976,099

CUTTER HEAD

Harold W. Sprague, Brockton, Mass.

Application July 30, 1932, Serial No. 626,350

1 Claim. (Cl. 144—219)

My present invention is a novel and improved form of cutter head, particularly intended for use in operating on hard woods of uneven contour, such as cutting shoe lasts, golf club heads, and the like, particularly where the cutter follows a model.

In my prior and copending application, Ser. No. 555,445, filed August 6, 1931, and now Patent No. 1,935,337 issued Nov. 14, 1933 I have shown and described the type of improved cutter head of which the present invention is an improvement, such cutter heads being specially designed for operating in machines or lathes for turning shoe lasts, such for example, as that shown in my prior and copending application, Ser. No. 562,529, filed September 12, 1931, although any type of last turning machine could be utilized.

In my said prior application Ser. No. 555,445, I have shown and claimed an improved cutter head wherein my novel mushroom form is utilized, with a plurality of cutting edges in the side or as wings in a substantially conical contour to constitute a roughing cutter, and a finishing cutter fitted into the apex of the mushroom head and cooperating with the side cutting edges to operate both as a roughing and finishing action during the progressive feeding of the cutter on the article to be turned, such as a shoe last.

I also illustrated in said prior application a form of spiral cutting edge for the sides or wings in cooperation with the finishing cutter, which is positioned parallel with the axis of the cutter head. I have now discovered that by fitting the finishing cutter of my mushroom type of cutter head at an angle relatively with the axis of rotation of the cutter head, I secure the further advantages, particularly in a cutter head with the spirally formed edges, of the cutting action in a progressive or spiral operation from the extreme apex of the mushroom head to the base.

This feature is of considerable importance in still further insuring a smooth and uniform cutting action, eliminating danger of jumping or chattering, and also performing a substantially complete turning of the article, such as a last being operated on. The spiral action particularly of the finishing cutter substantially eliminates the formation of circumferential contours around a last, effecting a sufficiently smooth surface so as to largely eliminate the subsequent operation of smoothing and buffing. In fact, a last turned by my improved form of cutter head could be utilized for the manufacture of lasts without other finishing, smoothing, or cutting operations, except at the heel and toe only. I attribute this advantageous result largely to the feature of having the finishing cutter angularly positioned with respect to the axis of rotation so that it, in effect, carries out the spiral cutting action of the sides in the final finishing operation.

Furthermore, by so positioning the finishing cutter at an angle, I secure the advantages of greater bearing surface and strength in the cutter head, reducing the amount of metal cut away to fit in the finishing cutter, eliminating also the time and necessity of cutting out other metal to effect a balancing of the cutter head.

Further advantages, improvements, and details of construction will be hereinafter more fully pointed out and claimed.

Referring to the drawing illustrating a preferred embodiment;

Fig. 1 is a fragmentary view of the cutter head holding spindle and a last during the cutting operation;

Fig. 2 is a side view of my present improved cutter head;

Fig. 3 is a cross-sectional view on the line 3—3 of Fig. 2 on an enlarged scale;

Fig. 4 is a cross-sectional view on the line 4—4 of Fig. 2 showing same on an enlarged scale;

Fig. 5 is a top plan view of the cutter head, and

Fig. 6 is a cross-sectional view on the line 6—6 of Fig. 5 showing same on an enlarged scale.

While I prefer to utilize my present improved cutter head on a machine of the type shown in my said copending application Ser. No. 562,529, it will be appreciated that any suitable turning machine or lathe can be employed for such a cutter head. However, in the accompanying drawing I have illustrated a fragmentary portion of the machine of my said prior application, wherein the cutter head is designated generally at 25, having a base 20 of hexagonal form or other form to permit the application of a wrench thereto, and with a centrally tapped recess 21 adapted to fit upon the corresponding threaded end of a spindle 70 adapted to rotate in suitable bearings 93, 93 by rotation of a pulley 71 through a belt or the like, as shown in the machine of my said prior application.

In turning lathes of this type, it will be appreciated that the cutter head 25 is rotated at high speed and is moved progressively during the cutting action at the rate of speed desired, such movement being to the left, viewed in Fig. 1, while the work, herein shown as a last block 10 mounted between a "live center" 12 and dead center 14, is rotated in unison with the rotation of a finished last or model, with which a wheel is in contact and which swings the frame carrying the last block 10 in accordance with the contour of the model, thus duplicating the contour of the model during the cutting action on the block 10.

In my present form of cutter head, the head 25 is preferably of my novel type of mushroom cutter head, having a plurality of cutting edges herein shown as four in number, 30, 30, 30, 30, and preferably arranged slantingly, as shown. In the head of the mushroom cutter I form a recess 33 of sufficient area to receive a finishing cutter 35, this cutter being preferably of circular form with a circular cutting edge 36 interrupted for a short length in the periphery at 37 to afford clearance and held in position by a headed bolt 38, passing through a central recess 39 in the cutter 35 and being threaded into a correspondingly tapped recess 40 in the cutter head 25. My present improved arrangement permits the cutter head to have but a relatively slight amount of metal removed to form the recess 33 on which to fit and secure the finishing rotary cutter 35. Furthermore, this angularly slanting or bevelled nonaxial arrangement of the cutter 35 permits me to form the tapped recess 40 into the firm solid part of the cutter head 25, giving greater strength and saving manufacturing expense.

In my former cutter head with the finishing cutter positioned axially with relation to the axis of rotation, it was extremely difficult to secure enough metal in the construction there shown to hold the cutter head securely and also so much of the cutter head was removed as to require the removal of other material to effect a counterbalance of weight. In my present form, these objections are overcome and a stronger, simpler, much less expensive construction is obtained, with the added advantage of having the finishing cutter act progressively or spirally and carry out the complete cycle of cutting, as illustrated on the dotted line 44, giving the first or roughing cutting action 45 on the last block and a better, smoother final finishing cutting action 46. This enables the finishing cutter to perform a remarkably smooth cutting action on the last, practically producing a finished last directly from a block 10. While some additional smoothing and finishing is advisable, yet the usual ridges produced by a progressive cutting action in this type of machine are so trivial as to be smoothed or buffed out very readily at a minimum of work. The cutter 35 may be rotated as the edge wears from time to time and resharpened bringing the new edge into position. By simply loosening the retaining bolt 38, slightly rotating the cutter head and again tightening the bolt, ready removal and replacement is permitted.

I believe that my provision of an angularly positioned finishing cutter, such as the cutting member 35, is a distinct novelty in this art and while it is desirable to utilize the same in cooperation with my mushroom type of cutter head and with one or more side cutting edges 30, whether spirally or radially arranged, yet I wish to claim the angularly positioned circular cutting member 35 herein broadly.

I claim:

A combined roughing and finishing cutter head of the kind described, comprising a head of substantially mushroom shape, a ring-like cutting member having an interrupted cutting edge fitted in the apex of the cutter head extending across and at an acute angle to the axis of rotation of the cutter head, and cutting means extending divergingly from said apex.

HAROLD W. SPRAGUE.